US012766715B2

(12) United States Patent
Kumashiro et al.

(10) Patent No.: US 12,766,715 B2
(45) Date of Patent: Oct. 20, 2026

(54) ROBOT AND ROBOT SYSTEM

(71) Applicant: SEIKO EPSON CORPORATION, Tokyo (JP)

(72) Inventors: Shogo Kumashiro, Azumino (JP); Shunsuke Toshimitsu, Azumino (JP); Daisuke Komatsu, Suwa (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 19/047,826

(22) Filed: Feb. 7, 2025

(65) Prior Publication Data

US 2025/0256397 A1 Aug. 14, 2025

(30) Foreign Application Priority Data

Feb. 8, 2024 (JP) ................................. 2024-018205

(51) Int. Cl.
*B25J 9/16* (2006.01)

(52) U.S. Cl.
CPC ........... *B25J 9/1638* (2013.01); *B25J 9/1694* (2013.01)

(58) Field of Classification Search
CPC ........ B25J 9/1638; B25J 9/1694; B25J 9/044; B25J 19/0029
See application file for complete search history.

(56) References Cited

U.S. PATENT DOCUMENTS 11,090,803 B2 * 8/2021 Teranaka ............. B25J 19/0029
2012/0215356 A1 * 8/2012 Igarashi .................. B25J 19/02 901/46
2017/0239810 A1 8/2017 Bordegnoni et al.

FOREIGN PATENT DOCUMENTS

JP 2017-056542 A 3/2017
JP 2017-144545 A 8/2017

* cited by examiner

*Primary Examiner* — Gregory Robert Weber
(74) *Attorney, Agent, or Firm* — Harness, Dickey & Pierce, P.L.C.

(57) ABSTRACT

A robot including a base, a first arm, a second arm rotatably connected to the first arm, a shaft on which an end effector is mounted, an inertia sensor that is installed in the second arm, a motor unit installed in the second arm and configured to drive the shaft, and a duct connected to the base and to the second arm, wherein the second arm includes a first member having a first connection section to which the duct is connected and a second member that has a second connection section to which a wiring or a piping connected to the end effector is connected and that is positioned further to the shaft side than the first connection section, and an arm base having an attachment section to which the second member is attached and the inertia sensor is disposed between the motor unit and the attachment section.

10 Claims, 5 Drawing Sheets

ROBOT AND ROBOT SYSTEM

The present application is based on, and claims priority from JP Application Serial Number 2024-018205, filed Feb. 8, 2024, the disclosure of which is hereby incorporated by reference herein in its entirety.

BACKGROUND

1. Technical Field

The present disclosure relates to a robot and a robot system.

2. Related Art

The robot described in JP-A-2017-144545 includes a base, a first arm connected to the base so as to be rotatable around a first rotation axis, a second arm connected to the first arm so as to be rotatable around a second rotation axis, which is parallel to the first rotation axis, and a shaft connected to the second arm so as to be rotatable around a third rotation axis, which is parallel to the second rotation axis. The shaft is connected so as to be movable along the axial direction of the third rotation axis. An end effector is attached to a lower end section of the shaft. The second arm includes a base body and a cover that covers the upper section of the base body. The base body is provided with an intermediate body installed so as to cover further from the shaft toward the second rotation axis side. Various connector parts are installed on the upper section of the intermediate body.

In a configuration like that of JP-A-2017-144545, for example, when an inertia sensor for vibration damping control is provided in the second arm, the inertia sensor may pick up the vibration of the intermediate body. In addition, there is a problem in that the vibration component that is undesirably picked up becomes noise, and detection accuracy decreases.

SUMMARY

A robot of the present disclosure includes a base, a first arm connected to the base so as to be rotatable around a first rotation axis; a second arm connected to the first arm so as to be rotatable around a second rotation axis parallel to the first rotation axis; a shaft connected to the second arm so as to be rotatable around a third rotation axis parallel to the second rotation axis and so as to be movable along an axial direction of the third rotation axis, an end effector being mounted on the shaft; an inertia sensor that is installed in the second arm and that detects at least one of angular velocity or acceleration; a motor unit that is installed in the second arm and that is configured to drive the shaft; and a duct connected to the base and to the second arm, wherein the second arm includes a first member having a first connection section to which the duct is connected, a second member that includes a second connection section to which wiring or piping connected to the end effector is connected and that is positioned closer to a shaft side than is the first connection section, and an arm base having an attachment section to which the second member is attached and the inertia sensor is disposed between the motor unit and the attachment section.

A robot system of the present disclosure includes a robot including a base, a first arm connected to the base so as to be rotatable around a first rotation axis; a second arm connected to the first arm so as to be rotatable around a second rotation axis parallel to the first rotation axis; a shaft connected to the second arm so as to be rotatable around a third rotation axis parallel to the second rotation axis and so as to be movable along an axial direction of the third rotation axis, an end effector being mounted on the shaft; an inertia sensor that is installed in the second arm and that detects at least one of angular velocity or acceleration; a motor unit that is installed in the second arm and that is configured to drive the shaft; and a duct connected to the base and the second arm and a control device configured to control drive of the robot, wherein the second arm includes a first member having a first connection section to which the duct is connected, a second member provided with a second connection section to which wiring or piping connected to the end effector is connected, the second member being positioned closer toward the shaft side than is the first connection section, and an arm base having an attachment section to which the second member is attached and the inertia sensor is disposed between the motor unit and the attachment section.

A robot of the present disclosure includes a base, a first arm connected to the base so as to be rotatable around a first rotation axis; a second arm connected to the first arm so as to be rotatable around a second rotation axis parallel to the first rotation axis; a shaft connected to the second arm so as to be rotatable around a third rotation axis parallel to the second rotation axis and so as to be movable along an axial direction of the third rotation axis, an end effector being mounted on the shaft; an inertia sensor that is installed in the second arm and that detects at least one of angular velocity or acceleration; a first motor that is installed in the second arm and that is configured to output a drive force for rotating the shaft around the third rotation axis; a second motor that is installed in the second arm and that is configured to output a drive force for moving the shaft along an axial direction of the third rotation axis; a first endless belt configured to transmit a drive force output by the first motor to the shaft; a second endless belt configured to transmit the drive force output by the second motor to the shaft; and a duct connected to the base and to the second arm, wherein the second arm includes a first member having a first connection section to which the duct is connected, a second member provided with a second connection section to which wiring or piping connected to the end effector is connected, the second member being positioned closer toward the shaft side than is the first connection section, and an arm base having an attachment section to which the second member is attached and the first endless belt and the second endless belt intersect with each other when viewed along a straight line parallel to the second rotation axis, and the inertia sensor is disposed between the attachment section and a position where the first endless belt and the second endless belt intersect each other.

DESCRIPTION OF EMBODIMENTS

Hereinafter, a robot and a robot system according to the present disclosure will be described in detail based on embodiments illustrated in the accompanying drawings.

First Embodiment

Figure 1:
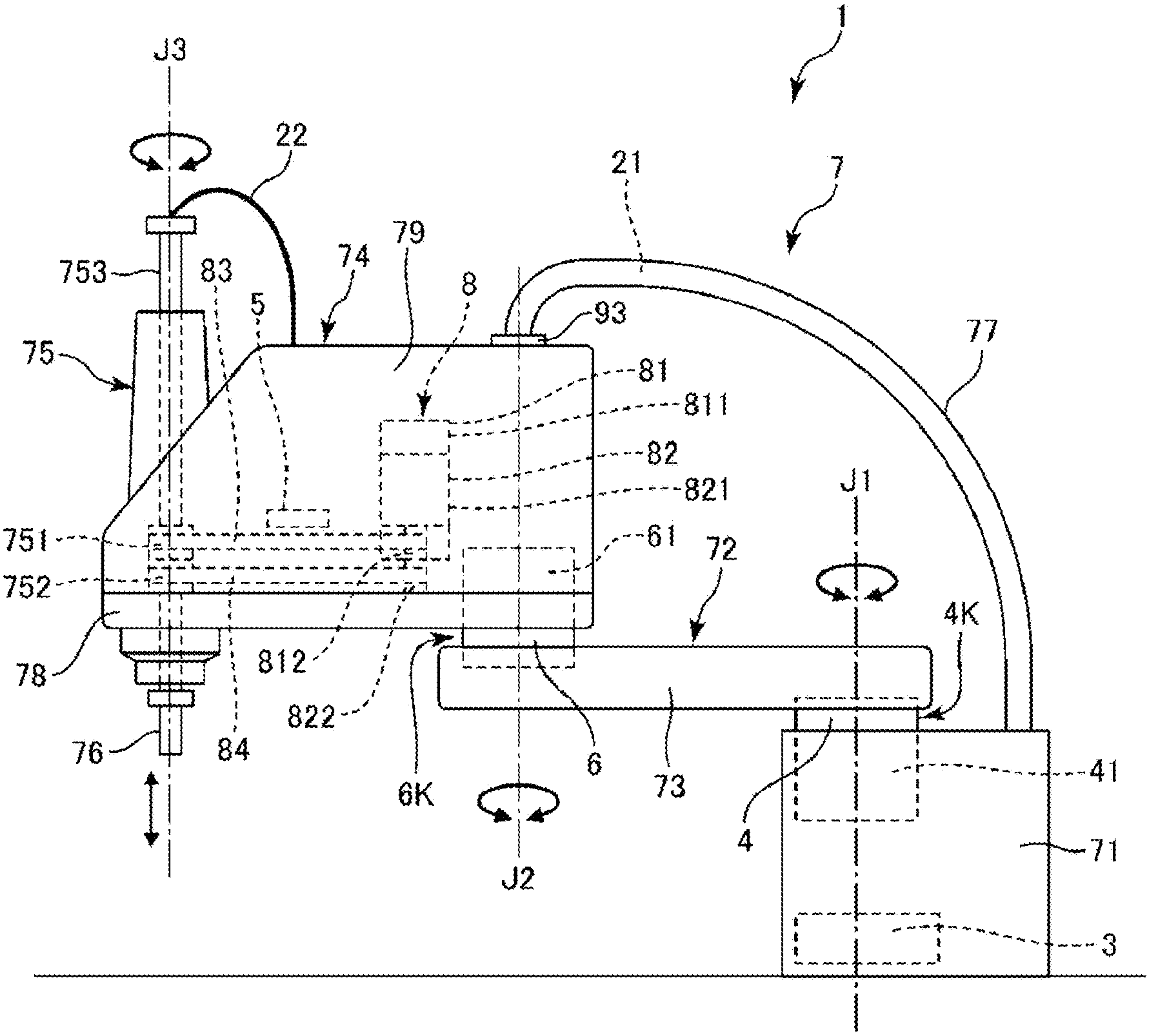
FIG. 1 is a schematic configuration diagram of a robot system according to a first embodiment of the present disclosure.
Figure 2:
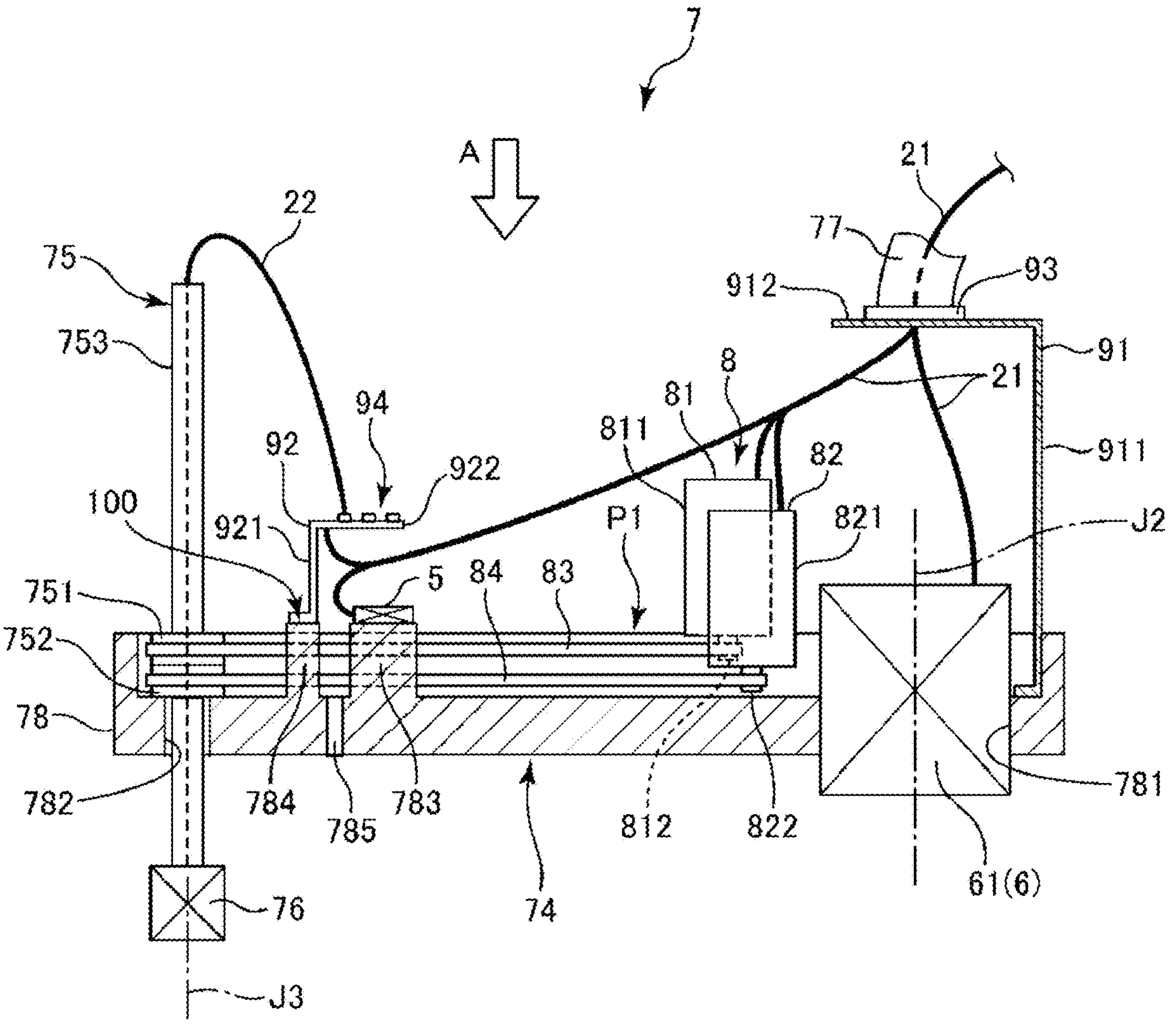
FIG. 2 is a partial sectional side view for explaining the internal structure of a second arm included in the robot shown in FIG. 1.
Figure 3:
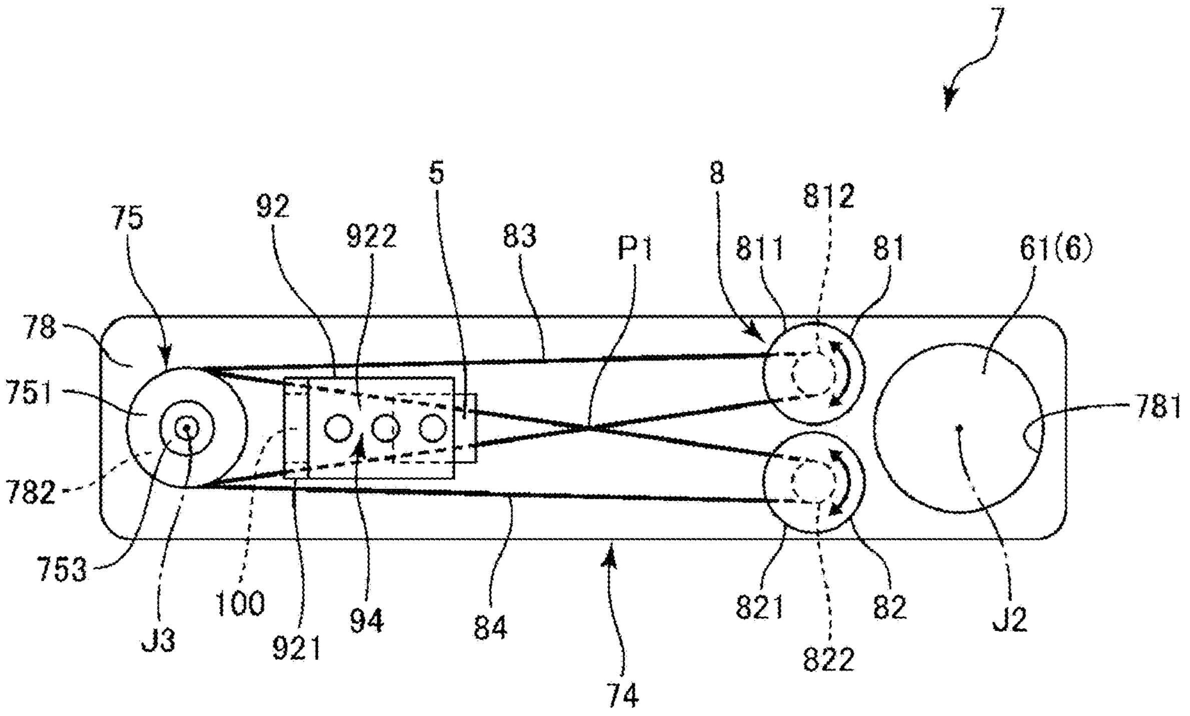
FIG. 3 is a view seen from the direction of arrow A in FIG. 2.

FIG. 1 is a schematic configuration diagram of a robot system according to a first embodiment of the present disclosure. FIG. 2 is a partial sectional side view for explaining the internal structure of a second arm included in the robot shown in FIG. 1. FIG. 3 is a view seen from the direction of arrow A in FIG. 2.

Note that the up-down direction in FIG. 1 coincides with the vertical direction, and that in FIG. 1 upward is referred to as up and the downward is referred to as down. Regarding a robot arm 72, a first arm 73, and a second arm 74, the right side in FIG. 1 is referred to as a "proximal end" or a "proximal end section", and the left side is referred to as a "distal end" or a "distal end section.

In the present specification, the term "vertical" means not only a case of being coincident with vertical, but also a case of being slightly inclined with respect to vertical, for example, within ±10°. In the present specification, the term "parallel" means not only a case where two objects are parallel to each other but also a case where two objects are slightly inclined from parallel to each other, for example, within ±10°. In the present specification, a "straight line" is a virtual straight line.

The robot system 1 illustrated in FIG. 1 includes a robot 7 and a control device 3 that controls drive of each part of the robot 7.

In the present embodiment, the robot 7 is a SCARA robot and performs various operations such as holding, transporting, assembling, processing, coating, and inspecting workpieces such as electronic components (hereinafter, these are collectively referred to as "operations"). However, the use of the robot 7 and the type of operation are not limited to the above. The robot 7 may be a ceiling-mounted SCARA robot, and in this case, the orientation of the robot 7 in the present embodiment would be inverted (upside down).

As shown in FIG. 1, the robot 7 includes a base 71 and a robot arm 72 rotatably connected to the base 71. The robot arm 72 includes a first arm 73 that has a proximal end section connected to the base 71 and that rotates with respect to the base 71 around a first rotation axis J1, which is along the vertical direction, and a second arm 74 that has a proximal end section connected to a distal end section of the first arm 73 and that rotates with respect to the first arm 73 around a second rotation axis J2, which is along the vertical direction. Note that the first rotation axis J1 and the second rotation axis J2 are virtual straight lines.

A proximal end section of a duct 77, which has a tubular outer shell, is connected to the base 71, and a distal end section of the duct 77 is connected to an upper section of second arm 74. The duct 77 is connected to the base 71 and the second arm 74, and guides a first elongated wire 21, which is inserted in the duct 77. The first elongated wire 21 is inserted into the inside of the duct 77. The first elongated wire 21 is a cable for driving an inertia sensor 5, a cable for driving a motor unit 8, a cable for driving a motor unit 61, and a cable for driving an end effector 76. That is, in the embodiment, the first elongated wire 21 includes wiring and piping, and is configured by wiring for supplying power to the inertia sensor 5, the motor unit 8, the motor unit 61, and the end effector 76, wiring for controlling the inertia sensor 5, the motor unit 8, the motor unit 61, and the end effector 76, supply piping for supplying a fluid such as compressed air to the end effector 76, and the like. Note that the first elongated wire 21 may include at least a cable for driving the end effector 76. The first elongated wire 21 may have a configuration that includes only one of either wiring or piping.

A proximal end side of the first elongated wire 21 is connected to, for example, the control device 3 or a power supply unit (not shown), and a distal end side of the first elongated wire 21 is connected to predetermined parts of the inertia sensor 5, the motor unit 8, the motor unit 61, and a second connection section 94 (to be described later).

The first elongated wire 21 may be provided as a single wire, or may be provided as a bundle of a plurality of wires. One or more connectors (not shown) may be provided along the first elongated wire 21.

A shaft 75 is provided at the distal end section of the second arm 74. The shaft 75 is also referred to as an operation shaft. The shaft 75 includes a spline nut 751 and a ball screw nut 752, which are coaxially disposed at the distal end section of the second arm 74, and a spline shaft 753, which is inserted through the spline nut 751 and the ball screw nut 752. The spline shaft 753 is rotatable with respect to the second arm 74 around a third rotation axis J3, which is the central axis of the spline shaft 753 and which extends along the vertical direction, and is movable up and down in a direction along the third rotation axis J3. Note that the third rotation axis J3 is a virtual straight line.

The end effector 76 is attached to a lower end section of the spline shaft 753. The end effector 76 is detachable with respect to the spline shaft 753, and an end effector suitable for the intended operation is selected as appropriate. Examples of the type of end effector 76 include a hand, a drill, a suction head, and the like.

The spline shaft 753 is composed of an elongated hollow body extending in the vertical direction, and a second elongated wire 22 is inserted inside the spline shaft 753. The second elongated wire 22 is a cable for driving the end effector 76. That is, in the present embodiment, the second elongated wire 22 includes wiring and piping, and is constituted by wiring for supplying power to the end effector 76, wiring for controlling the end effector 76, supply piping for supplying a fluid such as compressed air to the end effector 76, and the like. Note that the second elongated wire 22 may have a configuration that includes only one of either wiring or piping.

The proximal end side of the second elongated wire 22 is connected to a predetermined portion of the second connection section 94, and the distal end side of the second elongated wire 22 extends through the inner cavity of the spline shaft 753 to the end effector 76 and is connected to a predetermined portion of the end effector 76.

The second elongated wire 22 may be provided as a single wire or as a bundle of plural wires.

The robot 7 includes a first joint section 4K that rotatably connects the base 71 and the first arm 73. A drive section 4 that rotates the first arm 73 around the first rotation axis J1 with respect to the base 71 is installed in the first joint section 4K.

The robot 7 includes a second joint section 6K that rotatably connects the first arm 73 and the second arm 74. A drive section 6 that rotates the second arm 74 with respect to the first arm 73 around the second rotation axis J2 is installed in the second joint section 6K.

The drive section 4 includes a motor unit 41 and a power transmission mechanism (not shown) that includes, for example, a speed reducer. The drive section 6 includes a motor unit 61 and a power transmission mechanism (not shown) that includes, for example, a speed reducer.

The motor unit 41 generates a drive force for rotating the first arm 73 with respect to the base 71. The motor unit 61 generates a drive force for rotating the second arm 74 with respect to the first arm 73. Each of the motor units 41 and 61 includes a motor (not shown) and an encoder (not shown). The motor units 41 and 61 are not particularly limited, but are preferably servo motors such as an AC servo motor or a DC servo motor.

The robot 7 has a motor unit 8 for driving the shaft 75. The motor unit 8 is provided in the second arm 74 and includes a first motor unit 81 that rotates the spline nut 751 to rotate the spline shaft 753 around the third rotation axis J3 and a second motor unit 82 that rotates the ball screw nut 752 to raise and lower the spline shaft 753 in a direction along the third rotation axis J3, that is, in the vertical direction.

The robot 7 includes a first endless belt 83 that transmits the drive force output by the first motor unit 81 to the spline nut 751 of the shaft 75, and a second endless belt 84 that transmits the drive force output by the second motor unit 82 to the ball screw nut 752 of the shaft 75.

The first motor unit 81 includes a first motor 811 and an encoder (not shown). The second motor unit 82 includes a second motor 821 and an encoder (not shown). The first motor 811 and the second motor 821 are electrically connected to the control device 3. Energization conditions such as energization pattern, energization timing, and energization amount to the first motor 811 and the second motor 821 are controlled by the control device 3.

Note that one or both of the first motor unit 81 and the second motor unit 82 may include a speed reducer.

As shown in FIG. 2, the first endless belt 83 is wound around an output pulley provided on an output shaft 812 of the first motor 811 and an input pulley provided on the spline nut 751. By this, the drive force output from the first motor 811 can be transmitted to the shaft 75, and the shaft 75 can be rotated around the third rotation axis J3.

The second endless belt 84 is wound around an output pulley provided on an output shaft 822 of the second motor 821 and an input pulley provided on the ball screw nut 752. By this, the drive force output by the second motor 821 can be transmitted to the shaft 75, and the shaft 75 can be raised and lowered in the vertical direction.

The motors of the motor units 41 and 61, the first motor 811, and the second motor 821 are electrically connected to control device 3. Although not shown, each of the motors of the motor units 41 and 61, the first motor 811, and the second motor 821 includes a stator, a rotor that rotates inside the stator, and a case that houses these components. The stator is disposed along the inner periphery of the case and has a winding such as a three phase winding. The stator generates a magnetic field by energization of the winding, for example, by energization of a three phase alternating current. The energization pattern, the energization timing, the energization amount, and the like of the winding included in the stator of the motors of the motor units 41 and 61, the first motor 811, and the second motor 821 are controlled by the control device 3.

Each of the motor units 41 and 61, the first motor unit 81, and the second motor unit 82 includes a motor driver (not shown), but may not include a motor driver.

According to drive control of the control device 3, the motors of motor units 41 and 61, the first motor 811, and the second motor 821 rotate in either forward or reverse directions. The motors of motor units 41 and 61, the first motor 811, and the second motor 821 each rotate independently.

Note that the motors of the motor units 41 and 61, the first motor 811, and the second motor 821 may be the same type and have the same configuration, or may include motors that are different types and that have different configurations.

As shown in FIGS. 1, 2, and 3, the inertia sensor 5 is installed in the second arm 74, and detects inertial force of the second arm 74, that is, at least one of angular velocity or acceleration, and in the embodiment, the inertia sensor 5 detects both of them. The inertia sensor 5 may be an individual detection element, a detection element mounted on a circuit board, or a module in which these elements are accommodated in a housing. Note that when the detection element is mounted on a circuit board, the circuit board may have a function of acquiring the output of the inertia sensor 5 at least at a constant cycle and transmitting the output to the control device 3.

In the present embodiment, the inertia sensor 5 is installed on the arm base 78 of the second arm 74. In this case, the inertia sensor 5 may be directly supported or fixed to a predetermined portion of the arm base 78, or may be supported or fixed to the arm base 78 via some intermediate member (support member) different from the arm base 78. The inertia sensor 5 is disposed at a position overlapping, when viewed along a straight line parallel to the second rotation axis J2, a straight line extending so as to connect the second rotation axis J2 and the third rotation axis J3, that is, a straight line passing through the widthwise direction center of the second arm 74. Note that the inertia sensor 5 may be disposed at a position that does not overlap the straight line connecting the second rotation axis J2 and the third rotation axis J3 when viewed along the straight line parallel to the second rotation axis J2. The inertia sensor 5 is installed on the arm base 78, but may be installed under the arm base 78. The inertia sensor 5 is installed inside the second arm 74, but may be installed outside the second arm 74. Viewing along a straight line parallel to the second rotation axis J2 includes viewing from the axial direction of the second rotation axis J2 and viewing from the axial direction of the third rotation axis J3. In the present embodiment, the straight line parallel to the second rotation axis J2 is a straight line extending in the vertical direction.

In the configuration shown in FIG. 2, the inertia sensor 5 is installed on an upper section of a first protruding section 783 that constitutes a part of the arm base 78, but the inertia sensor 5 may be installed on the arm base 78 via another member (intermediate member) corresponding to a first protruding section 783.

A sensor coordinate system is set in the inertia sensor 5. The sensor coordinate system has an arbitrary point set in the inertia sensor 5 as the origin, and has an x-axis, a y-axis, and a z-axis, which are three axes orthogonal to each other.

In the embodiment, the inertial force detected by the inertia sensor 5 includes a total of six types of acceleration: acceleration in the direction along the x-axis, acceleration in the direction along the y-axis, acceleration in the direction along the z-axis, angular velocity around the x-axis, angular velocity around the y-axis, and angular velocity around the z-axis. That is, the inertia sensor 5 is an inertial measurement unit (IMU) that detects acceleration and angular velocity in three axial directions that are orthogonal to each other.

However, the configuration is not limited to this, and the inertia sensor 5 may be configured to detect only the acceleration in the direction along the x-axis, the acceleration in the direction along the y-axis, and the acceleration in the direction along the z-axis, or may be configured to detect only the angular velocity around the x-axis, the angular velocity around the y-axis, and the angular velocity around the z-axis. A configuration may be adopted in which only acceleration in a direction along one or two of the x-axis, the y-axis, and the z-axis is detected, or a configuration may be adopted in which only angular velocity around one or two axes of the x-axis, the y-axis, and the z-axis is detected.

In addition to these, the inertia sensor 5 may be configured to detect only angular acceleration around the x-axis, angular acceleration around the y-axis, and angular acceleration around the z-axis. A configuration may be adopted in which only the angular acceleration in a direction along one or two of the x-axis, the y-axis, and the z-axis is detected, or a configuration may be adopted in which only the angular acceleration around one or two axes of the x-axis, the y-axis, and the z-axis is detected.

Although not illustrated, the control device 3 shown in FIG. 1 includes a control section having at least one central processing unit (CPU), a storage section that stores various programs and the like executed by the control section, and a communication section that transmits and receives signals to and from the robot 7 or an external device. These sections are communicably connected to each other via, for example, a bus. In the present embodiment, the control device 3 is installed inside the base 71, but it may be installed in another location.

The control device 3 is connected to the inertia sensor 5 and acquires a signal from the inertia sensor 5 over time. Based on the signal from the inertia sensor 5, the control device 3 controls operation of one or both of the motor units 41 and 61 so as to suppress vibration of the second arm 74. By this, vibration damping control can be performed on the second arm 74. Note that the control device 3 may perform learning based on the signal from the inertia sensor 5 and, based on the learning result, control the operation of the motor units 41 and 61 so as to suppress vibration of the second arm 74.

Next, the internal structure of the second arm 74 will be described.

As shown in FIG. 1, the second arm 74 has an arm base 78 and a cover 79. Note that the cover 79 is not shown in FIG. 2.

The cover 79 is constituted by a housing whose lower portion is open, and has the function of covering the upper section of the arm base 78 by being mounted on the arm base 78 to protect internal components. The cover 79 is composed of, for example, a plate material formed by molding a resin material into a desired three-dimensional shape. The cover 79 preferably has elasticity to such an extent that it is slightly deformed when a force is applied to it. For example, the cover 79 may be formed by shaping a plate material made of a metal material, such as stainless steel or aluminum, into a desired three-dimensional shape. The cover 79 may be a frame-shaped body.

The arm base 78 is constructed of a rigid body that has the function of supporting internal components within the second arm 74 and the shaft 75. Examples of the constituent material of the arm base 78 include various metal materials, various resin materials, particularly hard resin materials, various ceramics, and the like. Also, a composite material obtained by arbitrarily combining these materials may be used. Of these, examples of the metal material include stainless steel and aluminum.

The arm base 78 is shaped like an elongated block extending in one direction, that is, the left-right direction in FIGS. 1 to 3. Note that the form, shape, and the like of the arm base 78 are not limited to those described above and, for example, the arm base 78 may be formed of a plate-like body, a frame-like body, or a combination of these.

As shown in FIGS. 2 and 3, an installation section 781 in which the drive section 6 is installed is provided at a proximal end section of the arm base 78, and a through hole 782 through which the shaft 75 is inserted is provided at a distal end section of the arm base 78.

The installation section 781 is formed of a through hole having the second rotation axis J2 as its central axis. The drive section 6 is fixed to an inner peripheral portion of the installation section 781.

The through hole 782 is constituted by a through hole having the third rotation axis J3 as a central axis. The ball screw nut 752 is fixed to the edge of the upper opening of the through hole 782.

The arm base 78 supports the drive section 6 and the shaft 75 as described above, and also supports the first motor unit 81, the second motor unit 82, the inertia sensor 5, a first stay 91, a second stay 92, and the like.

The first motor unit 81 and the second motor unit 82 are installed between the drive section 6 and the shaft 75 with respect to the horizontal direction in FIGS. 1 to 3, that is, in the longitudinal direction of the arm base 78. When viewed along a straight line parallel to the second rotation axis J2 or when viewed along the widthwise direction (to be described later), at least a part of the first motor unit 81 and the second motor unit 82 is located between the inertia sensor 5 and the drive section 6, that is, at least a part is installed at a position nearer to the drive section 6 side than to the inertia sensor 5. By this, it is possible to keep the drive section 6 at a distance from the inertia sensor 5, to shorten the second arm 74 and also to effectively utilize the space between the second rotation axis J2 and the third rotation axis J3. At this time, the distance between the rotation center of the first motor unit 81 and the second rotation axis J2 is shorter than the distance between the rotation center of the first motor unit 81 and the third rotation axis J3, and the distance between the rotation center of the second motor unit 82 and the second rotation axis J2 is shorter than the distance between the rotation center of the second motor unit 82 and the third rotation axis J3. As shown in FIG. 3, the first motor unit 81 and the second motor unit 82 are arranged side by side along the widthwise direction of the arm base 78. That is, when viewed from the widthwise direction, at least a portion of the first motor unit 81 overlaps at least a portion of the second motor unit 82. Note that when viewed along a straight line parallel to the second rotation axis J2, the widthwise direction is a direction intersecting with a straight line that connects the second rotation axis J2 and the third rotation axis J3 and, in the present embodiment, is a direction orthogonal to a straight line that connects the second rotation axis J2 and the third rotation axis J3.

Note that in FIG. 2, the first motor unit 81 and the second motor unit 82 are illustrated as being shifted along the longitudinal direction of the arm base 78 to make them easily visible.

The first motor unit 81 is fixed to the arm base 78 via a fixing member (not shown) in an orientation in which the output shaft 812 protrudes downward. The fixing member of the first motor unit 81 is attached to the case of the first motor 811. The second motor unit 82 is fixed to the arm base 78 via a fixing member (not shown) in an orientation in which the output shaft 822 protrudes downward. The fixing member of the second motor unit 82 is attached to the case of the second motor 821. The lower end of the output shaft 812 of the first motor unit 81, that is, the output pulley of the output shaft 812, is positioned higher than the lower end of the output shaft 822 of the second motor unit 82, that is, the output pulley of the output shaft 822. By this, as shown in FIG. 2, the first endless belt 83 and the second endless belt 84 are disposed so as to be spaced apart from each other in the vertical direction, and can be prevented from interfering with each other.

The lower end section of the first stay 91 is installed further in the longitudinal direction of the arm base 78 toward the proximal end side (right side in FIG. 2) than is the installation section 781, that is, further to the side opposite from the shaft 75 than is the installation section 781 in which the drive section 6 is installed. The first stay 91 is a first member with a first connection section 93. The first stay 91 includes a first portion 911 that is upright in the vertical direction and a second portion 912 that extends in the horizontal direction from an upper end of the first portion 911 toward the distal end side. Both the first portion 911 and the second portion 912 are each flat plate-shaped. However, they are not limited to this configuration, and the first portion 911 and the second portion 912 may have other shapes, such as a rod shape. A plurality of first portions 911 may be provided, and the second portion 912 may be supported by the plurality of first portions 911.

The first connection section 93 to which the duct 77 is connected is provided on the upper surface side of the second portion 912. When viewed along a straight line parallel to the second rotation axis J2, the first connection section 93 overlaps with the second rotation axis J2. That is, the first connection section 93 is positioned on a straight line extending along the second rotation axis J2. The first connection section 93 may be a connector to which the duct 77 is attachable and detachable, a fixing section that fixes the duct 77, or the like.

The first elongated wire 21 protrudes downward from the first connection section 93 from the lower surface side of the second portion 912, that is, a wiring for driving the motor unit 61 of the drive section 6 extends from the first connection section 93. The first elongated wire 21 protrudes from the first connection section 93 from the lower surface side of the second portion 912 toward the distal end side, that is, wiring for driving the inertia sensor 5, the first motor unit 81, and the second motor unit 82 extends from the first connection section 93. A locking member (not shown) is provided on the distal end side of the first portion 911, and the first elongated wire 21 is locked by the locking member. Note that the locking member may be provided on the second portion 912, or may be provided in neither the first portion 911 nor the second portion 912.

The second stay 92 is installed at a position in the longitudinal direction of the arm base 78 that is between the installation section 781 and the through hole 782 and that is nearer to the through hole 782. The second stay 92 is a second member that includes the second connection section 94 and that is positioned further to the shaft 75 side than is the first connection section 93. The second stay 92 includes a first portion 921 that is upright in the vertical direction and a second portion 922 that extends in the horizontal direction from an upper end of the first portion 921 toward the proximal end side. Both the first portion 921 and the second portion 922 are each flat plate-shaped. However, they are not limited to this configuration, and the first portion 921 and the second portion 922 may have other shapes, such as a rod shape. A plurality of first portions 921 may be provided, and the second portion 922 may be supported by the plural first portions 921.

The second portion 922 extends toward the proximal end side and is positioned above the inertia sensor 5. That is, the second portion 922 has a portion overlapping with the inertia sensor 5. By this, the second arm 74 can be shortened, and the space between the second rotation axis J2 and the third rotation axis J3 can be effectively utilized.

The second portion 922 is provided with a second connection section 94 to which the second elongated wire 22 is connected. The second connection section 94 may be a connector to which the second elongated wire 22 is attachable and from which the second elongated wire 22 is detachable, a fixing portion that fixes a proximal end section (terminal portion) of the second elongated wire 22 by, for example, a screw or soldering, or the like. The second elongated wire 22 is routed to an upper section of the spline shaft 753 through a through hole (not shown) provided in an upper section of the cover 79.

The first elongated wire 21 is connected to the second connection section 94 from the lower surface side of the second portion 922. A locking member (not shown) is provided at the proximal end side of the first portion 921, and the first elongated wire 21 is locked by the locking member. Note that the locking member may be provided on the distal end side of the first portion 921 or on the second portion 922.

The arm base 78 includes a first protruding section 783 and a second protruding section 784. The upper end of the first protruding section 783 and the upper end of the second protruding section 784 are both located above the first endless belt 83 and the second endless belt 84. The first protruding section 783 and the second protruding section 784 are provided so as not to contact the first endless belt 83 and the second endless belt 84.

In the present embodiment, the first protruding section 783 and the second protruding section 784 are projecting sections that protrude upward from the arm base 78. The projecting sections have a trapezoidal shape, that is, their upper section has a planar shape, and in this embodiment, they have a block shape, particularly, a prismatic shape. However, this is not a limitation, and the projecting sections may have another shape such as a truncated pyramid shape, a columnar shape, a truncated cone shape, a cylindrical shape, a plate shape which is bent as desired, or a frame shape, and may be solid or hollow.

The first protruding section 783 and the second protruding section 784 are provided between the motor unit 8 and the shaft 75 in the longitudinal direction of the arm base 78. That is, the first protruding section 783 and the second protruding section 784 are provided between the motor unit 8 and the shaft 75 when viewed along a straight line parallel to the second rotation axis J2 or when viewed along the widthwise direction. The first protruding section 783 and the second protruding section 784 are disposed so as to be spaced apart from each other by being shifted in a direction in which the second rotation axis J2 and the third rotation axis J3 are arranged. Regarding the positional relationship between the first protruding section 783 and the second protruding section 784, the first protruding section 783 is located on the motor unit 8 side (proximal end side), and the second protruding section 784 is located on the shaft 75 side (distal end side).

The inertia sensor 5 is installed on the upper section of the first protruding section 783. A lower end section of the second stay 92 is installed on an upper section of the second protruding section 784. Both the inertia sensor 5 and the second stay 92 are installed on a protruding section and fixed to a protruding section, for example, by using one or more fixing members such as screws. An upper surface of the second protruding section 784 is an attachment section 100 to which the second stay 92 is attached. The attachment section 100 is positioned between the inertia sensor 5 and the shaft 75 when viewed along a straight line parallel to the second rotation axis J2 or when viewed along the widthwise direction.

Note that each of the first protruding section 783 and the second protruding section 784 may be formed of a plurality of projecting sections. Since the inertia sensor 5 or the second stay 92 is supported by a plurality of projecting sections, the inertia sensor 5 or the second stay 92 is less likely to vibrate, and the projecting sections can be easily arranged or shaped so as not to interfere with the endless belt or the like. In this case, a fixing member such as a screw may be used for each projecting section. The plurality of projecting sections may have different configurations. The projecting sections may be separate members from the arm base 78. For example, the projecting sections may be rod-shaped members separate from the arm base 78, and the first protruding section 783 and the second protruding section 784 may be constituted by a plurality of rod-shaped members spaced apart from each other, like leg sections. The configurations of the first protruding section 783 and the second protruding section 784 may be different from each other. For example, the first protruding section 783 may include a plurality of columnar projecting sections, and the second protruding section 784 may include only one prismatic projecting section. The first protruding section 783 and the second protruding section 784 may be omitted. In this case, the inertia sensor 5 and the second stay 92 are fixed to the arm base 78 using, for example, a fixing member such as a screw. At this time, the location where the second stay 92 is attached by a fixing member such as a screw is the attachment section 100.

The first protruding section 783 and the second protruding section 784 may be connected to each other. That is, instead of the first protruding section 783 and the second protruding section 784, a single protruding section may be provided, or a connection member for connecting the first protruding section 783 and the second protruding section 784 may be provided. In either case, the protruding section is less likely to vibrate, and the effect of the present disclosure can be remarkably obtained.

As shown in FIG. 3, when viewed along a straight line parallel to the second rotation axis J2, the first endless belt 83 and the second endless belt 84 partially intersect each other and, when viewed along the straight line parallel to the second rotation axis J2, the inertia sensor 5 is installed on the inside of the first endless belt 83 and of the second endless belt 84 and to the attachment section 100 side (distal end side) of the position (intersecting position) P1 where the first endless belt 83 and the second endless belt 84 intersect each other. By this, it is possible to further separate the inertia sensor 5 from the first motor unit 81 and the second motor unit 82, which may be a generation source of vibration that is undesirable for damping control or the like, that is, is superfluous vibration.

The arm base 78 has a through hole 785 penetrating in the vertical direction, that is, in the axial direction of the second rotation axis J2. In the embodiment, the through hole 785 is provided at a position between the first protruding section 783 and the second protruding section 784, that is, a position between the inertia sensor 5 and the attachment section 100 in the longitudinal direction of the arm base 78. That is, the through hole 785 is provided between the inertia sensor 5 and the attachment section 100 when viewed along a straight line parallel to the second rotation axis J2 or when viewed along the widthwise direction. However, the position where the through hole 785 is formed is not limited to this. For example, the through hole 785 may be formed closer to the proximal end side than the first protruding section 783 of the arm base 78, may be formed closer to the distal end side than the second protruding section 784, and further, a plurality of through holes 785 may be formed in at least one of these places.

Such a through hole 785 has, for example, a function of releasing, to outside, heat that was generated in the drive section 6, the motor unit 8, the inertia sensor 5, and the like and that has accumulated inside the second arm 74, that is, it has a heat dissipation function. By this, it is possible to prevent an excessive temperature rise inside the second arm 74, and in particular, it is possible to dissipate heat generated by the inertia sensor 5 to the outside and to prevent a temperature rise of the inertia sensor 5. Therefore, the detection accuracy of the inertia sensor 5 is maintained high, that is, it is possible to sufficiently detect the vibration that was originally desired to be detected, and it is possible to more accurately perform the above-described vibration damping control. As a result, it is possible to operate the robot 7 more stably.

When the position where the through hole 785 is formed is between the inertia sensor 5 and the attachment section 100, vibration transmitted from the second stay 92 to the arm base 78 through the attachment section 100 is less likely to be directly transmitted to the inertia sensor 5 due to the through hole 785, which is advantageous in suppressing vibration of the inertia sensor 5.

As described above, the through hole 785 is provided in the arm base 78, penetrating the arm base 78 in the axial direction of the second rotation axis J2 in between the inertia sensor 5 and the attachment section 100. By this, it is possible to radiate, to outside, the heat inside the second arm 74, particularly, the heat generated by the inertia sensor 5. Due to the through hole 785, the vibration transmitted from the second stay 92 through the attachment section 100 is less likely to be transmitted to the inertia sensor 5. Therefore, the detection accuracy of the inertia sensor 5 is maintained high, and the vibration damping control of the robot arm 72 can be performed more accurately. As a result, it is possible to operate the robot 7 more stably.

Note that the through hole 785 may be omitted. One or two or more through holes 785 may be provided in another location of the arm base 78 of the second arm 74 or any other arbitrary location, for example, in the cover 79. For example, when the through hole 785 is provided between the through hole 782 and the second protruding section 784 or between the installation section 781 and the first protruding section 783, in addition to being provided at the position shown in FIG. 2, then the above-described heat dissipation effect is further improved.

Here, as described above, the inertia sensor 5 detects the inertial force of the second arm 74 in order to perform damping control of the robot arm 72, but it also picks up superfluous vibration components, that is, undesirable vibration components with respect to damping control (hereinafter referred to as "superfluous vibration" or "superfluous vibration component") such as vibration of the shaft 75, vibration of the attachment section 100, vibration of the second stay 92, vibration of the motor unit 8, vibration of the drive section 6, and other noise. When a superfluous vibration component is included, the accuracy of damping control decreases. Therefore, it is necessary to dispose the inertia sensor 5 at a position where superfluous vibration components are not detected as much as possible. In the related art, this problem has not been sufficiently studied. However, in the present disclosure, the above-described problem has been resolved by configuring the positional relationship of each portion in the longitudinal direction of the second arm 74 as follows. This will be described below.

As shown in FIGS. 2 and 3, the attachment section 100, the inertia sensor 5, and the motor unit 8 are arranged in the robot 7 in this order from the third rotation axis J3 toward the second rotation axis J2 so as to be spaced apart from each other in the longitudinal direction of the second arm 74. That is, since the shaft 75, the attachment section 100, the motor unit 8, and the drive section 6, which are sources of superfluous vibration, are disposed to be separated from the inertia sensor 5, it is possible to suppress detection by the inertia sensor 5 of superfluous vibration components. In particular, it is possible to keep the shaft 75 and the drive section 6, which generate particularly large vibrations among the superfluous vibrations, farther from the inertia sensor 5 than the second stay 92 and the motor unit 8, which generate relatively small vibrations, and it is possible to more remarkably suppress detection by the inertia sensor 5 of superfluous vibrations.

Due to these synergistic effects, by adopting the above-described arrangement, it is possible to remarkably suppress the detection of superfluous vibration by the inertia sensor 5, and it is possible to more accurately perform damping control of the robot arm 72 with high accuracy. As a result, it is possible to increase the accuracy of the operation performed by the robot 7. Note that when the motor unit 8 is the first motor unit 81 and the second motor unit 82, the inertia sensor 5 may be disposed, for example, between the attachment section 100 and the midpoint between the rotation centers of the first motor unit 81 and the second motor unit 82. It may alternatively be disposed between the attachment section 100 and the outer shape or the rotation center of the first motor unit 81 and also between the attachment section 100 and the outer shape or the rotation center of the second motor unit 82. Note that motor unit 8 may be only one of the first motor unit 81 or second motor unit 82. In this case, the inertia sensor 5 may be disposed between the attachment section 100 and the outer shape or the rotation center of either the first motor unit 81 or the second motor unit 82.

In the present embodiment, unlike the related art configuration, the first stay 91 and the second stay 92 are installed independently of each other, so that the degree of freedom of installation of members such as wiring is improved in the space between the first stay 91 and the second stay 92. For example, it is also possible to reduce the height of either or both the first stay 91 and the second stay 92. Therefore, it is possible to reduce the size, the length, and the weight of the second arm 74, and consequently to reduce the size of the robot 7. In particular, since miniaturization, shortening, and weight reduction of the second arm 74 contribute to a reduction in the inertial mass of the second arm 74, the operating speed of the robot arm 72 can be increased, and the efficiency of the operation performed by the robot 7 can be improved. Note that since the first stay 91 and the second stay 92 are independent from each other, the second stay 92, which supports the weight of the second connection section 94, is likely to vibrate. In particular, in the case of a cantilever structure with only the single first portion 921 of the present embodiment, or in the case where the second arm 74 is elongated in the longitudinal direction, the vibration of the second stay 92 becomes large. However, since the attachment section 100 of the second stay 92 is located between the inertia sensor 5 and the shaft 75, that is, closer to the shaft 75 than is the inertia sensor 5, it is possible to distance the shaft 75 from the inertia sensor 5, to shorten the second arm 74, and to effectively utilize the space between the second rotation axis J2 and the third rotation axis J3. The second connection section 94 of the second stay 92 can be brought closer to the shaft 75. By shortening the length of the second elongated wire 22, the second elongated wire 22 is less likely to shake, so it is possible to suppress vibration transmitted from the second elongated wire 22 to the inertia sensor 5 via the second stay 92.

As described above, the robot 7 includes the base 71, the first arm 73, which is connected to the base 71 so as to be rotatable around first rotation axis J1, the second arm 74, which is connected to the first arm 73 so as to be around the second rotation axis J2, which is parallel to the first rotation axis J1, the shaft 75, which is connected to the second arm 74 so as to be rotatable around the third rotation axis J3, which is parallel to the second rotation axis J2, and also so as to be movable along the axial direction of the third rotation axis J3, and on which the end effector 76 is mounted, the inertia sensor 5, which is installed on the second arm 74 and which detects at least one of angular velocity or acceleration, the motor unit 8, which is installed in the second arm 74 and which drives the shaft 75, and the duct 77 which is connected to the base 71 and to the second arm 74. The second arm 74 includes the first stay 91, which is a first member having the first connection section 93 to which duct 77 is connected, the second stay 92, which is a second member positioned closer to the shaft 75 than is the first connection section 93 and which has the second connection section 94 to which the second elongated wire 22, which includes one of a wiring and piping connected to end effector 76, is connected, and the arm base 78, which has the attachment section 100 to which the second stay 92 is attached. The inertia sensor 5 is positioned between the motor unit 8 and the attachment section 100. By this, it is possible to effectively suppress that the inertia sensor 5 detects superfluous vibration. As a result, it is possible to more appropriately perform various kinds of control using the detection value of the inertia sensor 5, for example, vibration damping control of the robot arm 72.

The robot system 1 includes the robot 7 including the base 71, the first arm 73, which is connected to the base 71 so as to be rotatable around the first rotation axis J1, the second arm 74, which is connected to the first arm 73 so as to be rotatable around the second rotation axis J2, which is parallel to the first rotation axis J1, the shaft 75, which is connected to the second arm 74 so as to be rotatable around the third rotation axis J3, which is parallel to the second rotation axis J2, which is movable along the axial direction of the third rotation axis J3, and to which the end effector 76 is mounted, the inertia sensor 5, which is installed on the second arm 74 and which detects at least one of angular velocity or acceleration, the motor unit 8, which is installed in the second arm 74 and which drives the shaft 75, and the duct 77, which is connected between the base 71 and the second arm 74, and the control device 3, which controls drive of the robot 7. The second arm 74 includes the first stay 91, which is a first member having the first connection section 93 to which the duct 77 is connected, the second stay 92, which is a second member positioned closer to the shaft 75 than is the first connection section 93 and which has the second connection section 94 to which the second elongated wire 22, which includes one of a wiring or piping connected to end effector 76, is connected, and the arm base 78, which has the attachment section 100 to which the second stay 92 is attached. The inertia sensor 5 is positioned between motor unit 8 and attachment section 100. By this, it is possible to effectively suppress that the inertia sensor 5 detects superfluous vibration. As a result, it is possible to more appropriately perform various kinds of control using the detection value of the inertia sensor 5, for example, vibration damping control of the robot arm 72.

Note that the present embodiment describes the case where the first stay 91 is provided, but the present disclosure is not limited to this, and the first stay 91 may be omitted. In this case, the first connection section 93 to which the duct 77 is connected is installed, for example, on the upper section of the cover 79. The cover 79 is a first member to which the duct 77 is connected.

The motor unit 8 includes the first motor unit 81 and the second motor unit 82, the second arm 74 has the first endless belt 83 that transmits drive force output from the first motor unit 81 to the shaft 75 and the second endless belt 84 that transmits drive force output from the second motor unit 82 to the shaft 75, the arm base 78 has the first protruding section 783 that protrudes further upward than the first endless belt 83 and the second endless belt 84, and the inertia sensor 5 is installed on the upper section of the first protruding section 783. By this, it is possible to prevent the inertia sensor 5 from interfering with the first endless belt 83 and the second endless belt 84. As a result, it is possible to prevent the inertia sensor 5 from detecting superfluous vibration caused by contact and interference with the first endless belt 83 and the second endless belt 84, and it is possible to smoothly and desirably perform drive of the shaft 75, that is, rotation and raising and lowering of the spline shaft 753.

It is possible to keep the inertia sensor 5 a distance away from the shaft 75, the second stay 92, and the motor unit 8, which may be generation sources of superfluous vibration. Therefore, it is possible to more effectively suppress that the inertia sensor 5 detects superfluous vibration.

Note that the upper section of the first protruding section 783 may be at the same height as the first endless belt 83 or the second endless belt 84, or may be located at a position lower than the first endless belt 83 and the second endless belt 84. The first protruding section 783 may be omitted.

The arm base 78 includes the second protruding section 784, which protrudes upward higher than the first endless belt 83 and the second endless belt 84, and the attachment section 100 is disposed on the upper section of the second protruding section 784. By this, it is possible to prevent the second stay 92 from interfering with the first endless belt 83 and the second endless belt 84, and to keep the second stay 92, which may be a source of superfluous vibration, away from the inertia sensor 5. As a result, it is possible to more remarkably suppress the detection of superfluous vibration by the inertia sensor 5, and it is possible to smoothly and favorably perform drive of the shaft 75, that is, the rotation and elevation of the spline shaft 753.

Note that the upper section of the second protruding section 784 may have the same height as the first endless belt 83 or the second endless belt 84, or may be located at a position lower than the first endless belt 83 and the second endless belt 84. The second protruding section 784 may be omitted.

When viewed along a straight line parallel to the second rotation axis J2, the first endless belt 83 and the second endless belt 84 intersect each other and the inertia sensor 5 is installed further to the attachment section 100 side than is the position P1 where the first endless belt 83 and the second endless belt 84 intersect each other. By this, it is possible to further separate the inertia sensor 5 from the first motor unit 81 and the second motor unit 82, which may be a generation source of superfluous vibration. As a result, it is possible to more remarkably suppress the inertia sensor 5 from detecting superfluous vibration.

Note that the inertia sensor 5 may be installed closer to the first motor unit 81 and the second motor unit 82 side than is position P1.

The clearance between the second rotation axis J2 and the third rotation axis J3 is preferably 375 mm or more and 1000 mm or less, and more preferably 425 mm or more and 600 mm or less. In a case where the clearance between the second rotation axis J2 and the third rotation axis J3 is in the above-described range, the second arm 74 is relatively long and easily vibrates, and thus the effect of the present disclosure is more remarkably obtained.

It should be noted that in the present disclosure, the clearance between the second rotation axis J2 and the third rotation axis J3 is not particularly limited, and may be out of the above range.

When viewed along a straight line parallel to the second rotation axis J2, the inertia sensor 5 has a portion overlapping the second connection section 94. By this, it is possible to further shorten the length of the second arm 74 and to reduce the inertial weight of the second arm 74. As a result, it is possible to increase the operation speed of the robot arm 72 and to improve the efficiency of the operations performed by the robot 7. The space between the second rotation axis J2 and the third rotation axis J3 can be effectively utilized.

Second Embodiment

Note that when viewed along a straight line parallel to the second rotation axis J2, the inertia sensor 5 may or may not entirely overlap the second connection section 94.

Figure 4:
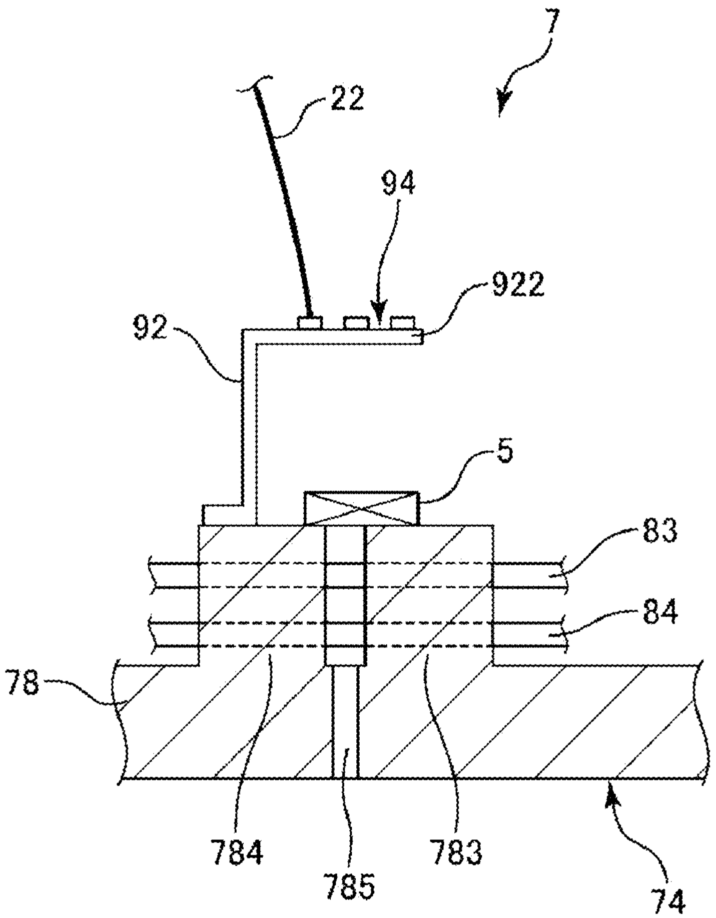
FIG. 4 is an enlarged partial cross-sectional view of an arm base of a second arm in a robot system according to a second embodiment of the present disclosure.

FIG. 4 is an enlarged partial cross-sectional view of an arm base of a second arm in a robot system according to a second embodiment of the present disclosure.

Hereinafter, a robot and the robot system according to the second embodiment of the present disclosure will be described with reference to FIG. 4, although the description will focus mainly on the differences from the first embodiment, and description of similar matters will be omitted.

As shown in FIG. 4, the inertia sensor 5 is installed spanning between the first protruding section 783 and the second protruding section 784. That is, a proximal end section (the end section on the second rotation axis J2 side) of the inertia sensor 5 is fixed to the upper section of the first protruding section 783, and a distal end section (the end portion on the third rotation axis J3 side) of the inertia sensor 5 is fixed to the upper section of the second protruding section 784. With such a configuration, the length of the second arm 74 can be shortened, and the space between the second rotation axis J2 and the third rotation axis J3 can be effectively utilized.

In this manner, the inertia sensor 5 is installed spanning across the first protruding section 783 and the second protruding section 784. By this, it is possible to further shorten the length of the second arm 74 and to reduce the inertial weight of the second arm 74. As a result, it is possible to increase the operation speed of the robot arm 72 and to improve the efficiency of the operations performed by the robot 7. The space between the second rotation axis J2 and the third rotation axis J3 can be effectively utilized.

Third Embodiment

Figure 5:
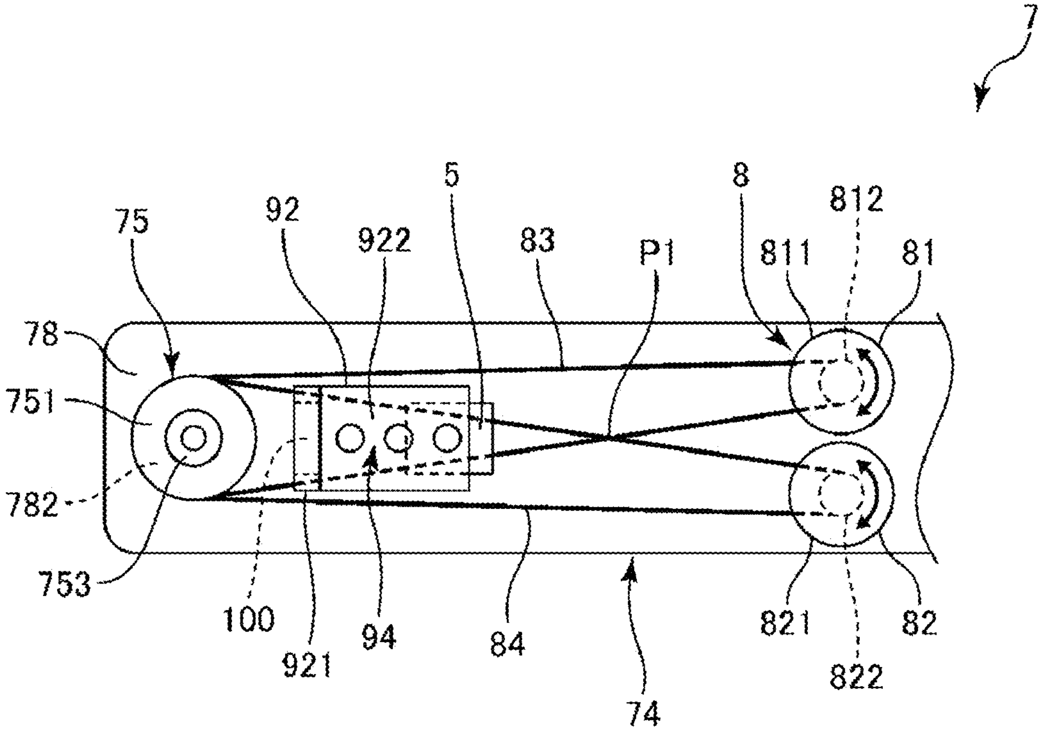
FIG. 5 is an enlarged top view of an arm base of a second arm in a robot according to the third embodiment of the present disclosure.

FIG. 5 is an enlarged top view of an arm base of a second arm in a robot according to a third embodiment of the present disclosure.

Hereinafter, the robot and a robot system according to the third embodiment of the present disclosure will be described with reference to FIG. 5, although differences from the first embodiment will be mainly described, and description of similar matters will be omitted.

As shown in FIG. 5, the first endless belt 83 and the second endless belt 84 intersect each other at position P1 when viewed along a straight line parallel to the second rotation axis J2. The inertia sensor 5 is separated from the first motor 811, the second motor 821, and the attachment section 100. The inertia sensor 5 is installed between the position P1, where the first endless belt 83 and the second endless belt 84 intersect each other, and the attachment section 100 in the longitudinal direction of the arm base 78. According to such a configuration, it is possible to position the inertia sensor 5 separated from the shaft 75, the attachment section 100, the first motor 811, and the second motor 821, which may be sources of superfluous vibration. Therefore, it is possible to suppress that the inertia sensor 5 detects superfluous vibration.

Further, since the inertia sensor 5 is installed between the position P1, where the first endless belt 83 and the second endless belt 84 intersect each other, and the attachment section 100, it is possible to keep the inertia sensor 5 away from the first motor 811 and the second motor 821, which generate particularly large vibration among the superfluous vibrations, and it is possible to more remarkably suppress the inertia sensor 5 from detecting superfluous vibrations.

Due to the above-described synergistic effect, it is possible to more effectively suppress that the inertia sensor 5 detects superfluous vibration, and it is possible to more accurately perform vibration damping control of the robot arm 72 with high precision. As a result, it is possible to increase the accuracy of the operations performed by the robot 7.

The robot 7 includes the base 71, the first arm 73, which is connected to the base 71 so as to be rotatable around the first rotation axis J1, the second arm 74, which is connected to the first arm 73 so as to be rotatable around the second rotation axis J2, which is parallel to the first rotation axis J1, the shaft 75, which is connected to the second arm 74 so as to be rotatable around a third rotation axis J3, which is parallel to the second rotation axis J2, and so as to be movable along the axial direction of the third rotation axis J3, with the end effector 76 mounted on the shaft 75, the inertia sensor 5, which is mounted on the second arm 74 and which detects at least one of angular velocity or acceleration, the first motor 811, which is installed in the second arm 74 and which outputs a drive force that rotates the shaft 75 around the third rotation axis J3, the second motor 821, which is installed in the second arm 74 and which outputs drive force that rotates the shaft 75 around the third rotation axis J3, the first endless belt 83, which transmits drive force output by the first motor 811 to the shaft 75, the second endless belt 84, which transmits drive force output by the second motor 821 to the shaft 75, and the duct 77, which is connected to the base 71 and to the second arm 74. The second arm 74 includes the first stay 91, which is a first member having the first connection section 93 to which the duct 77 is connected, the second stay 92, which is a second member positioned closer to the shaft 75 than is the first connection section 93 and which has the second connection section 94 to which the second elongated wire 22, which includes one of wiring and piping connected to the end effector 76, is connected, and the arm base 78, which has the attachment section 100 to which the second stay 92 is attached. The inertia sensor 5 is positioned between the motor unit 8 and the attachment section 100. When viewed along a straight line parallel to the second rotation axis J2, the first endless belt 83 and the second endless belt 84 intersect each other, and the inertia sensor 5 is disposed between the attachment section 100 and the position P1, where the first endless belt 83 and the second endless belt 84 intersect each other. By this, it is possible to effectively suppress that the inertia sensor 5 detects superfluous vibration. As a result, it is possible to more appropriately perform various kinds of control using the detection value of the inertia sensor 5, for example, vibration damping control of the robot arm 72.

Note that unlike the configuration shown in the drawings, in the present embodiment the shaft 75 may be adjacent to the second stay 92 (the attachment section 100) or may be disposed between the second stay 92 (the attachment section 100) and the inertia sensor 5. The shaft 75 and the second stay 92 (the attachment section 100) may be arranged at the second protruding section 784.

Above, the robot and robot system according to the present disclosure have been described based on the illustrated embodiments, but the present disclosure is not limited thereto, and the configuration of each section of the robot and the robot system can be replaced with an arbitrary configuration having the same function. Other arbitrary components may be added to the robot and the robot system.

The robot may include a locking member that locks the second elongated wire. The locking member can be used by being fixed to the second stay, the inner wall of the arm base, or the like.

The robot may have a plate that supports the spline shaft. In this case, the inertia sensor is disposed separated from the spline shaft.

What is claimed is:

1. A robot comprising:
- a base;
- a first arm connected to the base so as to be rotatable around a first rotation axis;
- a second arm connected to the first arm so as to be rotatable around a second rotation axis parallel to the first rotation axis;
- a shaft connected to the second arm so as to be rotatable around a third rotation axis parallel to the second rotation axis and so as to be movable along an axial direction of the third rotation axis, an end effector being mounted on the shaft;
- an inertia sensor that is installed in the second arm and that detects at least one of angular velocity or acceleration;
- a motor unit that is installed in the second arm and that is configured to drive the shaft; and
- a duct connected to the base and to the second arm, wherein
- the second arm includes
  - a first member having a first connection section to which the duct is connected,
  - a second member that includes a second connection section to which wiring or piping connected to the end effector is connected and that is positioned closer to a shaft side than is the first connection section, and an arm base having an attachment section to which the second member is attached and the inertia sensor is disposed between the motor unit and the attachment section.

2. The robot according to claim 1, wherein the motor unit includes a first motor unit and a second motor unit, the second arm includes a first endless belt that transmits drive force output from the first motor unit to the shaft and a second endless belt that transmits drive force output from the second motor unit to the shaft, and the arm base includes a first protruding section that protrudes further upward than the first endless belt and the second endless belt, and the inertia sensor is installed on an upper section of the first protruding section.

3. The robot according to claim 2, wherein the arm base includes a second protruding section that protrudes further upward than the first endless belt and the second endless belt and the attachment section is disposed on an upper section of the second protruding section.

4. The robot according to claim 3, wherein the inertia sensor is installed spanning between the first protruding section and the second protruding section.

5. The robot according to claim 1, wherein the first endless belt and the second endless belt intersect with each other when viewed along a straight line parallel to the second rotation axis and the inertia sensor is installed closer to an attachment section side than a position where the first endless belt and the second endless belt intersect with each other.

6. The robot according to claim 1, wherein a clearance between the second rotation axis and the third rotation axis is 375 mm or more.

7. The robot according to claim 1, wherein when viewed along a straight line parallel to the second rotation axis, a portion of the inertia sensor overlaps the second connection section.

8. The robot according to claim 1, wherein a through hole penetrating in an axial direction of the second rotation axis is provided in the arm base between the inertia sensor and the attachment section.

9. A robot system comprising:

a robot including a base, a first arm connected to the base so as to be rotatable around a first rotation axis, a second arm connected to the first arm so as to be rotatable around a second rotation axis parallel to the first rotation axis, a shaft connected to the second arm so as to be rotatable around a third rotation axis parallel to the second rotation axis and so as to be movable along an axial direction of the third rotation axis, an end effector being mounted on the shaft, an inertia sensor that is installed in the second arm and that detects at least one of angular velocity or acceleration, a motor unit that is installed in the second arm and that is configured to drive the shaft, and a duct connected to the base and the second arm and a control device configured to control drive of the robot, wherein the second arm includes a first member having a first connection section to which the duct is connected, a second member provided with a second connection section to which wiring or piping connected to the end effector is connected, the second member being positioned closer toward the shaft side than is the first connection section, and an arm base having an attachment section to which the second member is attached and the inertia sensor is disposed between the motor unit and the attachment section.

10. A robot comprising:

a base;

a first arm connected to the base so as to be rotatable around a first rotation axis;

a second arm connected to the first arm so as to be rotatable around a second rotation axis parallel to the first rotation axis;

a shaft connected to the second arm so as to be rotatable around a third rotation axis parallel to the second rotation axis and so as to be movable along an axial direction of the third rotation axis, an end effector being mounted on the shaft;

an inertia sensor that is installed in the second arm and that detects at least one of angular velocity or acceleration;

a first motor that is installed in the second arm and that is configured to output a drive force for rotating the shaft around the third rotation axis;

a second motor that is installed in the second arm and that is configured to output a drive force for moving the shaft along an axial direction of the third rotation axis;

a first endless belt configured to transmit the drive force output by the first motor to the shaft;

a second endless belt configured to transmit the drive force output by the second motor to the shaft; and a duct connected to the base and to the second arm, wherein the second arm includes a first member having a first connection section to which the duct is connected, a second member provided with a second connection section to which wiring or piping connected to the end effector is connected, the second member being positioned closer toward the shaft side than is the first connection section, and an arm base having an attachment section to which the second member is attached, the first endless belt and the second endless belt intersect with each other when viewed along a straight line parallel to the second rotation axis, and the inertia sensor is disposed between the attachment section and a position where the first endless belt and the second endless belt intersect each other.

* * * * *